(12) United States Patent
Dobschal

(10) Patent No.: US 7,671,822 B2
(45) Date of Patent: Mar. 2, 2010

(54) OPTICAL UNIT FOR A HEAD-UP DISPLAY

(75) Inventor: Hans-Juergen Dobschal, Kleinromstedt (DE)

(73) Assignee: Sypro Optics GmbH, Jena (DE)

( * ) Notice: Subject to any disclaimer, the term of this patent is extended or adjusted under 35 U.S.C. 154(b) by 780 days.

(21) Appl. No.: 11/425,805

(22) Filed: Jun. 22, 2006

(65) Prior Publication Data

US 2007/0008241 A1 Jan. 11, 2007

(30) Foreign Application Priority Data

Jun. 25, 2005 (DE) .................... 10 2005 029 583

(51) Int. Cl.
*G09G 5/00* (2006.01)
*G02B 27/14* (2006.01)

(52) U.S. Cl. .......................... 345/7; 359/630
(58) Field of Classification Search ................ 345/7–9; 359/630–633
See application file for complete search history.

(56) References Cited

U.S. PATENT DOCUMENTS

| 5,497,170 | A | * | 3/1996 | Kato et al. ...................... 345/9 |
| 5,497,271 | A | * | 3/1996 | Mulvanny et al. ........... 359/631 |
| 6,750,832 | B1 | * | 6/2004 | Kleinschmidt ................. 345/7 |
| 6,989,934 | B2 | | 1/2006 | Aoki et al. |
| 7,012,756 | B2 | * | 3/2006 | Takagi et al. ................. 359/631 |
| 7,060,343 | B2 | * | 6/2006 | Freeman ..................... 428/172 |
| 2002/0084950 | A1 | | 7/2002 | Aoki et al. |
| 2004/0113866 | A1 | | 6/2004 | Aoki et al. |
| 2006/0098294 | A1 | * | 5/2006 | Suzuki et al. ............... 359/631 |

FOREIGN PATENT DOCUMENTS

| DE | 23 04 175 | 8/1973 |
| DE | 101 44 075 | 4/2003 |
| DE | 101 53 883 A1 | 5/2003 |
| DE | 101 57 605 C1 | 6/2003 |
| DE | 103 46 884 A1 | 5/2004 |
| DE | 103 44 688 A1 | 5/2005 |
| EP | 391 231 B1 | 6/1994 |

* cited by examiner

*Primary Examiner*—Sumati Lefkowitz
*Assistant Examiner*—Charles Hicks
(74) *Attorney, Agent, or Firm*—Price, Heneveld, Cooper, DeWitt & Litton LLP

(57) ABSTRACT

The invention is directed to an optical unit for a head-up display comprising an image generator, a mirror and a cover plate which are arranged in a housing one behind the other in the direction of light propagation. The beam path is directed to a windshield. The invention is wherein that the mirror is a rear-surface mirror whose reflection surface has a light-bundling action. The rear-surface mirror has, in addition, a refractive action that can be generated by the refractive index of the mirror material and a material thickness which changes between the reflection surface and the transmissive surface.

5 Claims, 2 Drawing Sheets

OPTICAL UNIT FOR A HEAD-UP DISPLAY

CROSS-REFERENCE TO RELATED APPLICATIONS

This application claims priority of German Application No. 10 2005 029 583.5, filed Jun. 25, 2005, the complete disclosure of which is hereby incorporated by reference.

FIELD OF THE INVENTION

Optical unit for a head-up display comprising an image generator, an individual mirror, and a cover plate which are arranged in a housing one behind the other in direction of light propagation, wherein the beam path is directed to a windshield.

DESCRIPTION OF THE RELATED ART

A display system which uses only a concave mirror as imaging element is shown in FIG. 1 of DE 23 04 175 A1. The display system generates a virtual image. An arrangement of this kind is also known as a head-up display.

DE 101 44 075 A1 discloses a head-up display which uses a plane mirror and a free-form mirror for image projection. The image information generated by an OLED display is projected on a partially reflecting windshield of the motor vehicle by means of the plane mirror and the free-form mirror, which is rotatable around an axis, and is reflected by the windshield into the viewing field of a driver of the motor vehicle.

The light coming from an image-generating element reaches the driver's eyes by way of at least two mirrors and the reflection at the windshield of the automobile and generates an image at a distance of approximately 2 m to 3 m in front of the driver, this image being located slightly below the actual viewing direction adopted when driving. In this way, it is possible to view the environment and the reflected information simultaneously in a relaxed manner. Imaging of this kind has the following essential qualitative features:

image field size
eye box size (by which is meant the region at eye level from which the driver can still see the image when moving his/her head)
absence of distortion
resolution
brightness Since the windshield (WSS) does not have a typical regular surface shape but is also used for imaging, it is necessary to incorporate a correction of the imaging error of the WSS. When mirrors are used, this can only be achieved by constructing at least one mirror as a free-form mirror. However, manufacture of free-form mirrors is very cost-intensive and, since reflections are involved, they are also particularly sensitive to tolerances relating to surface shape and accuracy of installation.

OBJECT AND SUMMARY OF THE INVENTION

Therefore, it is the primary object of the invention to provide a particularly simple optical unit which is not sensitive to tolerances and which is used as a head-up display (HUD) especially in automobile construction.

According to the invention, this object is met in that the mirror is a rear-surface mirror whose reflection surface has a light-bundling action, wherein the rear-surface mirror has, in addition, a refractive action that can be generated by the refractive index of the mirror material and a material thickness which changes between the reflection surface and the transmissive surface.

The reflection surface of the rear-surface mirror is cylindrical, spherical, aspherical, or is a free-form surface.

The change in the glass thickness between the reflection surface and the transmissive surface of the rear-surface mirror is carried out in a continuous manner such that the effect of a cylindrical lens, spherical lens, aspherical lens, or a lens with a free-form surface occurs.

The change in the glass thickness between the reflection surface and the transmissive surface of the rear-surface mirror is carried out in a discontinuous manner such that the effect of a Fresnel lens occurs.

In one construction, at least one of the optically active surfaces of the rear-surface mirror, the reflection surface and/or the transmissive surface, has a cylindrically shaped component which extends in a direction x from the driver to the passenger. Naturally, the cover plate can also have an imaging action. By means of the construction according to the invention it is possible to generate a high-quality image at a comparatively low cost.

In a particularly advantageous variant of the invention, it is no longer the mirror, but rather the front side of the rear-surface mirror that takes on the function of a free-form surface. This surface is penetrated twice with respect to transmission. The reflecting rear side of the mirror is constructed as a spherical surface. Accordingly, this rear-surface mirror is the only optically relevant component. The very critical mirror tolerances are reduced by a factor of about 3 compared to a surface mirror which is a free-form surface, since the free-form side of the mirror is used only in transmission. The reflecting side of the rear-surface mirror, which is very sensitive mechanically and optically, is spherical which greatly facilitates the production and control of the tolerances occurring therein. The cover glass that is located on the upper side of the dashboard is used in the conventional way. This cover glass is optimized with respect to its shape and installation position for purposes of reducing reflections. For example, an advantageous typical embodiment form is a concentric, cylindrical meniscus with a 15-degree tilt relative to the principal ray with meniscus radii of approximately 300 mm.

The arrangement according to the invention has a number of substantial advantages:

1. reduced installation space in the dashboard;
2. lower sensitivity to tolerances because the free-form surface is used in transmission and, further, fewer components are necessary in all;
3. no reflective free-form element is needed;
4. very large image sizes and eye box sizes are simultaneously possible with very good distortion correction over the entire eye box region.

In particular, it is possible by means of this principle to make do with only one optical imaging element in the form of a rear-surface mirror resulting in an enormous gain in installation space and reduction in cost. The deflecting angles that are required at the spherical mirror for this purpose are smaller, which has a very positive effect on the overall imaging quality which is at least as good as that of the previous known conventional multi-mirror systems.

Transparent plastic materials, particularly PMMA or ZEONEX, or glasses are preferably used as material for the rear-surface mirror and the cover plate.

The invention will be described in the following with reference to the drawings.

DESCRIPTION OF THE PREFERRED EMBODIMENTS

Figure 1:
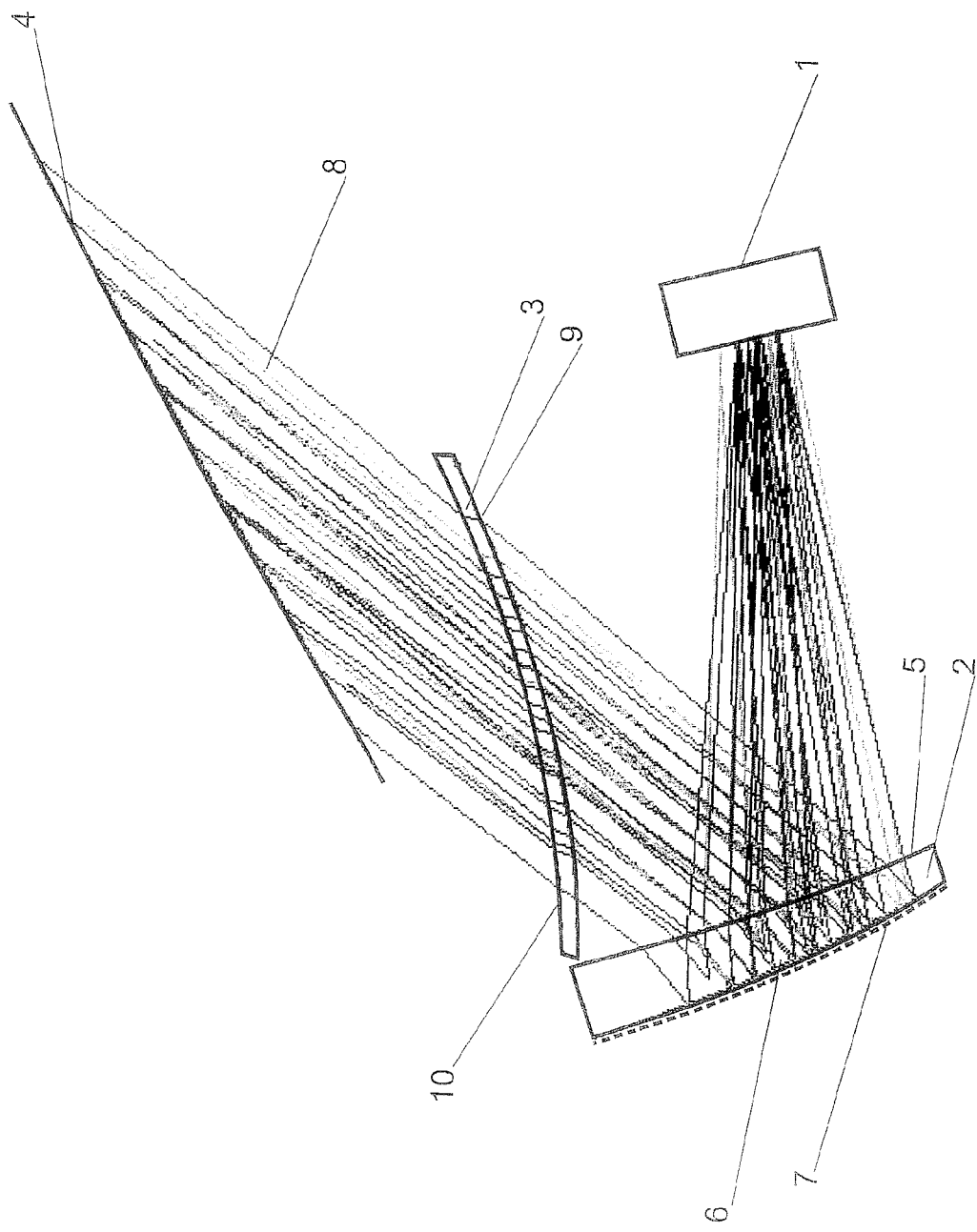
FIG. 1 is a general view of the construction of the optical unit.

FIG. 1 shows an optical unit for a head-up display along with its optical components. The necessary electronic components for controlling an image generator 1 and controls for adjusting the image position depending on the size of the driver are not shown.

The image generated by the image generator 1 is imaged virtually by means of a rear-surface mirror 6. A beam path 8 proceeds from the image generator 1 and penetrates a transmissive surface 5 of the rear-surface mirror 7. The beam path 8 continues through the transparent material of the rear-surface mirror 6, which is made of PMMA in the present example, impinges on the reflection surface, continues through the transparent material and then exits again at the transmissive surface. The beam path 8 is refracted twice and reflected once along this path. The beam path 8 then penetrates a cover plate 3 which does not alter the optical imaging (only a displacement of the beam takes place) and is reflected in direction of a driver at an inner surface of a windshield 4.

The cover plate 3 has an underside 9 and an upper side 10 and is likewise made of PMMA.

Figure 2:
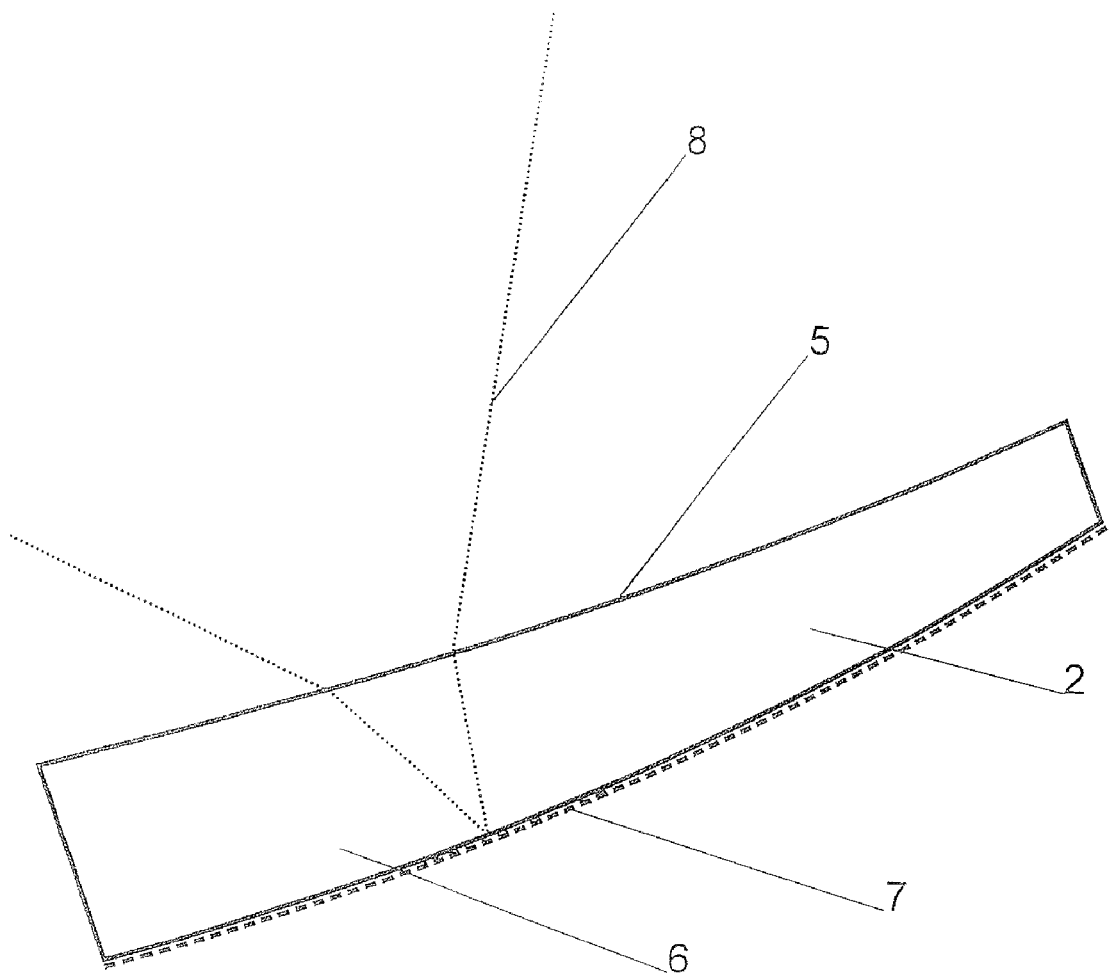
FIG. 2 shows a rear-surface mirror with a refractive action.

FIG. 2 shows the path of the beam path 8 in the rear-surface mirror 6 in detail.

The optical unit is described optically by global coordinates and angles of rotation of the components:

|  | X | Y | Z | X-angle | Y-angle | Z-angle |
|---|---|---|---|---|---|---|
| image | −356.44 | 557.58 | 1768.36 | 7.046 | 0.89 | 0.0 |
| eye box | −394.5 | 858.08 | 4199.57 | 7.046 | 0.0 | 0.0 |
| Reference point | 0.0 | 0.0 | 0.0 | 0.0 | 0.0 | 0.0 |
| Cover plate |  |  |  |  |  |  |
| upper side | −364.48 | 660.84 | 3356.77 | −75.00 | 0.0 | 0.0 |
| underside | −364.48 | 655.84 | 3356.77 | −75.00 | 0.0 | 0.0 |
| Rear-surface mirror |  |  |  |  |  |  |
| transmissive surface | −311.60 | 634.40 | 3293.80 | −159.143 | −9.200 | −3.373 |
| reflection surface | −308.41 | 627.37 | 3275.35 | −159.143 | −9.200 | −3.373 |
| Image generator | −359.99 | 597.48 | 3473.11 | −163.341 | 1.359 | −16.530 |

The data refer to the following sequence of displacements:
1. Translation around x, y and z
2. Rotation around the X-axis (X-angle)
3. Rotation around the Y-axis (Y-angle)
4. Rotation around the Z-axis (Z-angle).

The reference point is located at 2709 mm in front of the front vehicle axis in the driving direction. The positive z-axis is directed opposite to the driving direction. The positive y-axis is directed vertically. The positive x-axis is directed from the driver to the passenger.

In this embodiment example, the visual field is 240×96 mm, the eye box size is 130 mm×70 mm, and the image generator area used is 33.7×13.5 mm. The imaging scale is 7.14:1.

The cover glass is cylindrical and is determined by the following parameters: thickness: 5 mm; radius upper side: Ry=350 mm (cc) Rx=oo; and radius underside Ry=350 mm (cc) Rx=oo.

The c-coefficients for both mirrors are indicated in the following and have the following meaning: X3Y2, for example, refers to the coefficient in front of the product of the 3rd power of X and second power of Y.

The coefficients of the transmissive surface 5 of the rear-surface mirror 6, which is a free-form surface in this instance, are (specifications in CODE V standard):

$$z = \frac{cr^2}{1 + \sqrt{[1 - (1+k)c^2 r^2]}} + \sum_{j=2}^{66} C_j x^m y^n$$

$$j = \frac{[(m+n)^2 + m + 3n]}{2} + 1$$

The center of the test area has the following offset relative to the surface-oriented coordinate system of the reflection surface of the rear-surface mirror:

Offset in x-direction: −50.7 mm
Offset in y-direction: 44.3 mm
Radius r=777.356 mm (cc)

| K: | 1.196E+01 | X: | 4.193E−02 | Y: | 8.734E−02 |
|---|---|---|---|---|---|
| X2: | 2.495E−04 | XY: | 2.645E−04 | Y2: | −1.512E−04 |
| X3: | −1.052E−06 | X2Y: | 3.414E−06 | XY2: | −1.405E−06 |
| Y3: | −8.194E−08 | X4: | −7.671E−09 | X3Y: | 7.652E−09 |
| X2Y2: | −1.075E−08 | XY3: | −5.159E−09 | Y4: | 3.090E−09 |
| X5: | −2.881E−11 | X4Y: | 2.087E−11 | X3Y2: | −7.663E−11 |
| X2Y3: | 1.264E−11 | XY4: | −1.305E−11 |  |  |

The reflection takes place at the rear side of the rear-surface mirror 6 at reflection surface 7. The reflecting surface is spherical and has a radius of 568 mm (cc).

The windshield 4 has the following above-indicated coefficient set, for example:

| K: | 1.196E+01 | X: | 4.193E−02 | Y: | 8.734E−02 |
|---|---|---|---|---|---|
| X2: | 2.495E−04 | XY: | 2.645E−04 | Y2: | −1.512E−04 |
| X3: | −1.052E−06 | X2Y: | 3.414E−06 | XY2: | −1.405E−06 |
| Y3: | −8.194E−08 | X4: | −7.671E−09 | X3Y: | 7.652E−09 |
| 2Y2: | −1.075E−08 | XY3: | −5.159E−09 | Y4: | 3.090E−09 |
| X5: | −2.881E−11 | X4Y: | 2.087E−11 | X3Y2: | −7.663E−11 |
| X2Y3: | 1.264E−11 | XY4: | −1.305E−11 |  |  |

Further, the optical system is described by the intersection points of the zero beam with the components in the global coordinate system:

|  | X | Y | Z |
|---|---|---|---|
| image | −356.444 | 557.588 | 1768.365 |
| eye box | −394.5 | 858.084 | 4199.57 |
| Cover glass |  |  |  |
| upper side | −368.407 | 661.444 | 3358.981 |

-continued

|  | X | Y | Z |
|---|---|---|---|
| underside | 367.997 | 656.018 | 3357.417 |
| Rear-surface mirror transmissive upper surface |  |  |  |
| 1st passage | −358.355 | 586.012 | 3305.037 |
| Reflection surface | −356.563 | 574.718 | 3292.197 |
| transmissive surface |  |  |  |
| 2nd pass | −357.231 | 578.008 | 3308.172 |
| Image generator | −360.001 | 597.339 | 3473.155 |

While the foregoing description and drawings represent the present invention, it will be obvious to those skilled in the art that various changes may be made therein without departing from the true spirit and scope of the present invention.

REFERENCE NUMBERS 1 image generator
2 mirror
3 cover plate
4 windshield
5 transmissive surface
6 rear-surface mirror
7 reflection surface
8 beam path
9 underside
10 upper side

What is claimed is:

1. An optical unit for a head-up display comprising:
a housing;
an image generator;
a mirror; and
a cover plate;
said image generator, mirror and cover plate being arranged in said housing one behind the other in direction of light propagation, the beam path being directed to a windshield;
said mirror being a rear-surface mirror having a front free-form transmissive surface and a rear reflection surface which has a light-bundling action; and
said rear-surface mirror having, in addition, a refractive action that can be generated by the refractive index of the mirror material and a material thickness which changes between the reflection surface and the free-form transmissive surface.

2. The optical unit for a head-up display according to claim 1, wherein the shape of the transmissive surface of the mirror is based at least in part on the shape of the windshield.

3. The optical unit for a head-up display according to claim 1, wherein the change in the glass thickness between the reflection surface and the transmissive surface is carried out in a continuous manner such that a free-form surface occurs.

4. The optical unit for a head-up display according to claim 1, wherein the change in the glass thickness between the reflection surface and the transmissive surface is carried out in a discontinuous manner such that the effect of a Fresnel lens occurs.

5. The optical unit for a head-up display according to claim 1, wherein the reflection surface of the rear-surface mirror has a cylindrically shaped component which extends in a direction from the driver to the passenger.

* * * * *